United States Patent [19]

Weiman

[11] Patent Number: 4,476,646
[45] Date of Patent: Oct. 16, 1984

[54] FISHING LURE

[76] Inventor: Stephan E. Weiman, 4029 S. LaFayette, Bartonville, Ill. 61607

[21] Appl. No.: 502,507

[22] Filed: Jun. 9, 1983

[51] Int. Cl.³ .............................................. A01K 83/02
[52] U.S. Cl. ........................................ 43/34; 43/42.1; 43/42.41
[58] Field of Search .............. 43/34, 42.1, 42.4, 42.41, 43/42.25

[56] References Cited

U.S. PATENT DOCUMENTS

| | | | |
|---|---|---|---|
| 745,221 | 2/1903 | Miller | 43/34 |
| 1,180,073 | 4/1916 | Payton | 43/34 |
| 2,559,409 | 7/1951 | Dohmeyer | 43/34 |
| 2,591,013 | 4/1952 | Sampson | 43/34 |
| 2,596,564 | 5/1952 | Kautenberg | 43/34 |
| 2,948,985 | 8/1960 | Kizer | 43/34 |

Primary Examiner—Gene P. Crosby
Attorney, Agent, or Firm—McCaleb, Lucas & Brugman

[57] ABSTRACT

A fishing lure is disclosed having a V-shaped spring wire with two legs diverging rearwardly from an apex connectible to a fishing line. A trigger member and a sleeve are slidably mounted on one of the legs. A fishing hook is carried by the other of the legs. The trigger member has a looped catch portion releasably engageable with the rear end of the other leg to hold it in a "latched" position. The legs are resiliently compressible and can be squeezed together providing a contracted profile enabling the lure to be taken easily by a fish. When the fish takes the lure, the sleeve moves the trigger member from its latched position to a "released" position disengaging the other leg and enabling it to spring outwardly with the hook. Optionally, weed guard shield members in any suitable shape such as simulated butterfly wings, may be supported on the sleeve to protect the fishing hook.

11 Claims, 8 Drawing Figures

LATCHED

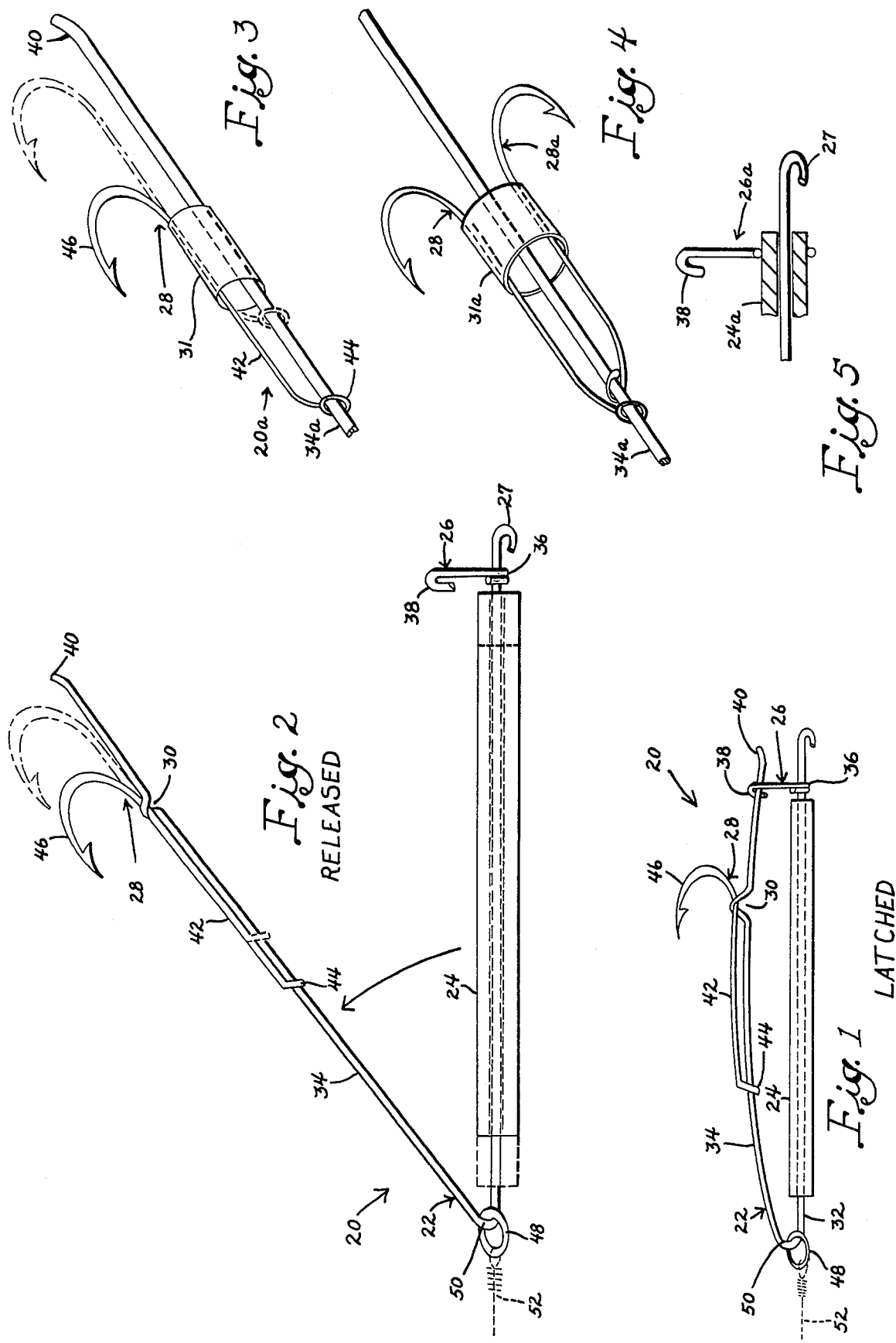

U.S. Patent  Oct. 16, 1984  Sheet 2 of 2  4,476,646
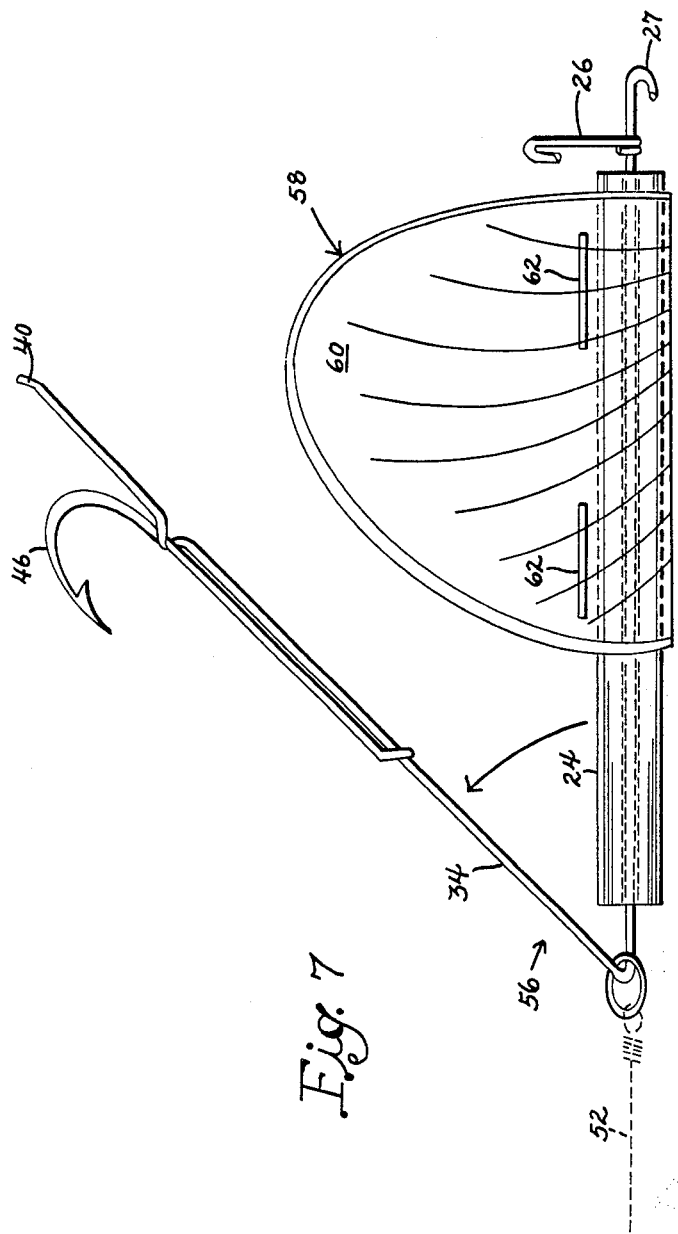
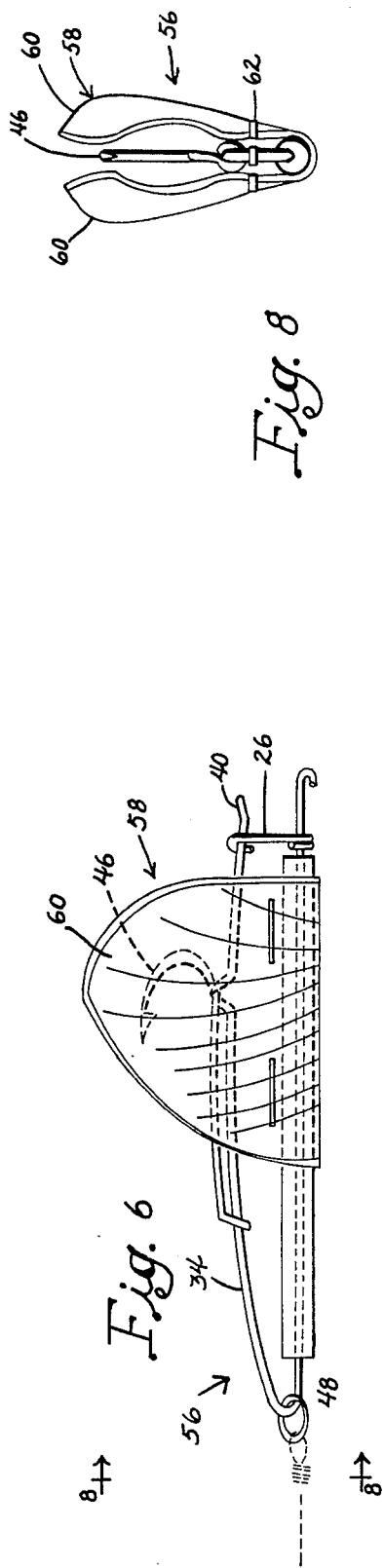

FISHING LURE

BACKGROUND OF THE INVENTION

This invention belongs generally to the field of fishing equipment and is particularly concerned with an improved self-setting fishing lure which optionally may be provided in a weedless form if desired.

Many fishing lures have been developed which enable a fisherman to set a hook or hooks in a fish's mouth in response to a pull on the line. Some of these utilize spring mechanisms which keep the hooks in compact or shielded positions until the fish bites at which time the fisherman pulls on the line to manually extend and set the hooks. It is very difficult for a fisherman to time the pull at exactly the right moment. Further, water creates a substantial drag on a line which results in some time delay. The noise of the line being jerked through the surface of the water, though generally inaudible to humans, can spook the fish before the setting motion of the line reaches the lure.

As a result, many fish are lost just at the instant they are about to be caught. This situation is in need of improvement.

SUMMARY OF THE INVENTION

It is a general object of the invention to provide a lure having a normally retracted fishing hook which is automatically sprung outwardly and set in response to the fish taking the lure and pulling backwardly on it.

An important object of the invention is to provide a fishing lure comprising a spring wire member formed in a V-shape, having two elastic legs diverging rearwardly from an apex connectable to a fishing line, a trigger member slidable on one of the legs in response to backward pull by a fish to automatically release the other, fishing hook supporting leg and thereby enable the fish itself to set the hook without manual intervention by the fisherman.

Another object is to provide, in association with the trigger member, a relatively long slidable sleeve which functions as an actuator member to move the trigger member from a position latched to the hook-carrying leg, to a position released therefrom when a fish swallows the lure and pulls backward on the slidable sleeve.

Another object is to provide the trigger member with a looped catch slidably supported on one of the legs of the V-shaped spring member, releasably engageable with an end portion of the other, hook-carrying leg, enabling the latter to spring outwardly, automatically, to a self-setting position when the trigger catch is disengaged in response to backward pull by the fish.

Another object is to provide a weedless or snag proof version of the invention in which guard shield members are supported on the slidable sleeve for movement therewith and such guard shield members provide a space between them to protect the fishing hook from being snagged while the lure is in its contracted profile, fishing condition.

Another object is to provide such a weedless in which the guard shield members are in the shape of simulated butterfly wings.

Another object is to provide a novel arrangement for releasably and adjustably supporting a fishing hook on the spring wire member by providing an angularly offset eyelet at one end of the fishing hook, threading it over the spring wire member, and providing connecting means pressing the fishing shank and wire member together to provide a releasable frictionally locked connection between the eyelet and the leg.

BRIEF DESCRIPTION OF THE DRAWINGS

Other objects and advantages will be apparent from the following description taken in connection with the accompanying drawings in which:

FIG. 1 is a side view of a fishing lure illustrating one form of the present invention in "latched" position providing a contracted profile to facilitate a fish taking it;

FIG. 2 is a view similar to FIG. 1 showing the lure in "released" or expanded, self-setting position;

FIG. 3 is a fragmentary view of another embodiment showing an optional way of mounting a fishing hook;

FIG. 4 is a view similar to FIG. 3 of a further alternate embodiment with multiple fishing hooks;

FIG. 5 is a fragmentary view similar to FIG. 2, showing a still further alternate embodiment in which the trigger member is a unitary part of the sliding sleeve member;

FIG. 6 is a view similar to FIG. 1 of a weedless or snag-proof embodiment of the invention in "latched" position;

FIG. 7 is a view similar to FIG. 2 showing the weedless embodiment in "released", automatically self-setting position; and FIG. 8 is a front view of FIG. 6 as seen in the direction of the arrows 8—8.

Like parts are referred to by like reference characters.

DETAILED DESCRIPTION OF THE DRAWINGS

Referring now to the specific embodiments of the invention in the drawings, the fishing lure shown in FIGS. 1 and 2 is generally designated 20 and comprises a spring wire member 22, a sleeve 24, a trigger member 26, and a fishing hook 28.

The spring wire member 22 is preferably of stainless steel and is formed in a V shape having two substantially straight legs 32 and 34 which diverge backwardly from an apex 50.

The sleeve 24 is a tube of metal or plastics slidably assembled for back and forth movement on one leg 32. Preferably, it will be of some indentable material enabling it to be readily engaged by a fish and pulled backwardly, from the broken to the solid line positions shown in FIG. 2.

The trigger member 26 as illustrated here is formed of wire with a bottom, closed-loop end 36 slidably engaged with leg 32. It has an upper, open-loop catch portion 38 releasably engageable with a slightly upwardly inclined end section 40 of the other wire member leg 34 as shown in the latched position of FIG. 1.

As an alternate to mounting the trigger member 26 and sleeve 24 separately on leg 32, a trigger member 26a can be mounted directly on a sleeve 24a as shown in FIG. 5.

The fishing hook 28 has an elongated shank 42, with an angularly offset eyelet 44 and a curved barbed portion 46 at opposite ends. The eyelet is looped over the other leg 34 and is held in releasable, frictionally locked engagement with a downwardly-open loop or bend 30 formed in the wire.

The fishing hook 28 can be adjustably shifted to diferent locked positions along the wire leg 34 by bending the leg 34 upwardly, shifting it sidewise to disengage it from the shank 42, followed by repositioning the hook as shown in broken lines in FIG. 2. In a similar fashion, it can be replaced by a new or different sized fishing hook.

An alternate arrangement for fastening a fishing hook is shown in FIG. 3. This is a fragmentary illustration of a fishing lure similar to FIG. 2 in all respects except that the leg 34a is substantially straight, lacking the downwardly open-loop 30 which characterizes leg 34. A holder 31 is provided to keep the fishing hook 28 in positive, yet releasable frictional locking engagement with the leg 34a. It is here illustrated as a flexible elastic tube of polyethylene, polypropylene, rubber or similar material. As shown in FIG. 3, the elastic tube 31 presses the shank 42 toward the leg 34a and causes the eyelet 44 to cock and bind the leg with a tight, frictional engagement.

The fishing hook 28 can also be adjustably shifted to different locked positions along the wire leg 34a by moving the fastener tube 31 forwardly (to the left in FIG. 3) far enough to disengage it from the shank 42, followed by re-setting the hook on the leg 34a and moving the fastener tube backwardly to restore it to the locked condition of FIG. 3. Alternate, adjusted positions are shown in solid and broken lines in FIG. 3.

As a further possibility, multiple hooks 28 and 28a may be held on leg 34a by a single fastening tube 31a as shown in FIG. 4. Elastic tube 31a may be slightly larger than tube 31 to accomodate two or more hooks.

A small loop or eyelet 48 is attached to the front apex 50 of the spring wire member 22. This is connected to any suitable fishing line 52.

To prepare the lure for use, sleeve 24 (or 24a) and trigger member 26 (or 26a) will be moved forward (to the left) on leg 32. The two legs 32 and 34 (or 34a) will then be squeezed together and the end portion 40 of leg 34 (or 34a) will be engaged by the looped catch portion 38 on the trigger member. This will place the lure in the latched, contracted-profile position shown for example in FIG. 1. When a fish strikes, it will bite the sleeve 24 (or 24a) and slide it backwardly along leg 32. This shifts the trigger member 26 (or 26a) backwardly, off the end portion 40 of the other leg and releases the latter so it springs outwardly and carries the hook 28 to the released, expanded-profile position shown in FIG. 2. The loop 27 at the rear end of leg 32 acts as a stop, limiting rearward movement of the sleeve and trigger member. This automatically and positively sets the hook in the fish's mouth.

The embodiments shown in FIGS. 3, 4 and 5 will operate similarly.

Referring now to the embodiment shown in FIGS. 5, 6 and 7, generally designated 56, this is a weedless or snag free version of the lure 20 shown in FIGS. 1 and 2. As illustrated, it is the same basic construction as the FIGS. 1 and 2 embodiment. The various components are designated by the same reference numerals where they may be identical. The major difference, in the embodiment of FIGS. 5-7, is a weed guard 58. In the form illustrated, this comprises a sheet of plastic material folded upwardly about the sleeve 24 to provide a pair of horizontally spaced vertical sheet members 60, 60 held in place as by staples 62, 62. These may be in any shape desired. As shown in FIGS. 6 and 7, they are formed to simulate a pair of butterfly or moth wings, but they may be formed in any other suitable configuration. The separate wing parts 60, 60 extend upwardly on both sides of the barbed fishing hook, as best shown in FIGS. 6 and 8. This protects the barb 46 from snagging in weeds and rocks as the lure is pulled through the water by the line 52.

In use, the embodiment of FIGS. 5-7 is squeezed to a compact profile as shown in FIG. 6, with the trigger member 26 holding the leg 34 compressed toward leg 32. When the fish strikes the lure and pulls the sleeve 24 and weed guard 58 backwardly on leg 32, the trigger member 26 releases the other leg 34 which then springs upwardly to the released position of FIG. 7, enabling the lure to set itself automatically in the fish's mouth.

The embodiments described and shown to illustrate the present invention have been necessarily specific for purposes of illustration. Alterations, extensions and modifications would be apparent to those skilled in the art.

The embodiments of the invention in which an exclusive property or privilege is claimed are defined as follows:

1. A fishing lure comprising:
a spring wire member of resilient material being formed in a V shape having two legs diverging rearwardly from an apex providing a connection for the fishing lure;
a trigger member slidably engaging one of said legs and being movable back and forth thereon, and having a catch position engageable with the other leg member;
a fishing hook carried by the other of said legs at an intermediate position thereon;
said legs being resiliently compressible toward one another to provide a contracted profile attractible to a fish;
said trigger member being movable along said one leg from a "latched" position with the catch portion thereof engaging said other leg and holding the two legs in their said contracted profile, to a "released" position disengaging the other leg and enabling it to spring outwardly; and
means supported on said one leg with the trigger member and engageable by a fish when swallowing the lure to move the trigger member backwardly to its said released position in response to backward pull by the fish;
whereby such backward pull exerted on the lure by the fish automatically moves the trigger member from the "latched" position of the "released" position, enabling said other leg to spring outwardly and automatically set the fishing hook in the fish's mouth.

2. A fishing lure according to claim 1 in which said trigger member includes a catch portion releasably enggeable with the rear end portion of said other leg.

3. A fishing lure according to claim 1 in which said means supported on said one leg with the trigger member is a sleeve slidably supported thereon.

4. A fishing lure according to claim 3 in which said trigger member and sleeve are separately slidably supported on said one leg.

5. A fishing lure according to claim 3 in which said trigger member and sleeve are fastened together for simultaneous slidable movement on said other leg.

6. A fishing lure accoring to claim 3 in which a pair of horizontally spaced weed guard shield members are supported on said sleeve for movement therewith and extend upwardly toward said other leg, said weed guard members having a space therebetween to receive said other leg and protect the fishing hook carried thereby when the legs are in their said contracted profile and the trigger member is in its said latched position with respect to the other leg, said other leg being movable outwardly to expose the fishing hook in said released position of the trigger member.

7. A fishing lure according to claim 6 in which the weed guard shield members are in the shape of simulated butterfly or moth wings.

8. A fishing lure according to claim 6 in which said fishing hook has an elongated shank with a curved, barbed portion at one end and an angularly offset eyelet at the other end, and connecting means pressing said shank and other leg together to provide a releasable frictionally lockable connection between said eyelet and other leg, whereby said fishing hook is readily repositioned along said other leg for optionally locating it between said weed guard shield members.

9. A fishing lure according to claim 1 in which said fishing hook has an elongated shank with a curved barbed portion at one end and an angularly offset eyelet at the other end engaging said other leg, and connecting means pressing said shank and other leg together to provide a releasable frictionally lockable connection between said eyelet and other leg, whereby the fishing hook is readily removed and replaced or repositioned on said other leg.

10. A fishing lure according to claim 8 in which said connecting means comprises an elastic tube encircling said shank and other leg.

11. A fishing lure according to claim 8 in which said connecting means comprises a loop in the other leg engaged with the shank.

* * * * *